March 14, 1961 H. H. ABBOTT 2,975,237
TELEPHONE CONFERENCE CIRCUIT
Filed Dec. 23, 1959
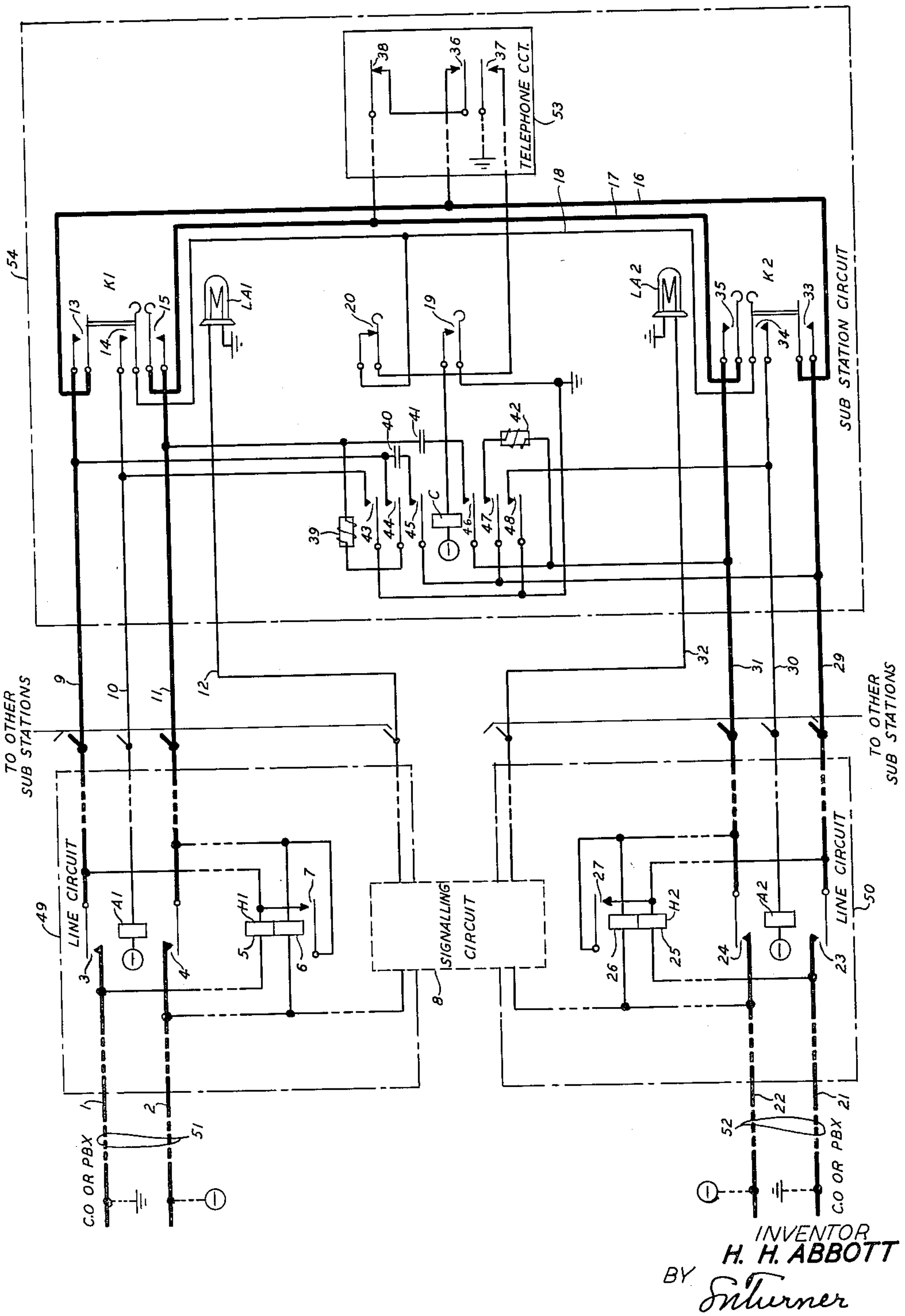
INVENTOR
H. H. ABBOTT
BY [signature]
ATTORNEY United States Patent Office
2,975,237
Patented Mar. 14, 1961

2,975,237

TELEPHONE CONFERENCE CIRCUIT

Henry H. Abbott, Chatham, N.J., assignor to Bell Telephone Laboratories, Incorporated, New York, N.Y., a corporation of New York Filed Dec. 23, 1959, Ser. No. 861,542

9 Claims. (Cl. 179—99)

This invention relates to telephone systems, and more particularly to conference facilities afforded multiline substation subscribers in such systems.

It is now common practice to provide business and residence subscribers with means for answering, originating, and holding calls on two or more central office, P.B.X, or intercommunicating lines. In the simplest case, two lines may be extended directly from a switching center to different key positions at a subscriber's substation; resistive or inductive holding bridges may then be associated with the respective lines in or about the substation circuit. More complicated situations are encountered, in the case of small business offices for instance, when a local wiring plan or key telephone system is employed to permit a plurality of lines to be variously distributed to a number of local substations. A particular substation subscriber may then have access to two or more lines, but have to share these lines with other local subscribers. In the latter case, there will usually be provided some means for holding which is individual to a particular line and operable from any one of the substations at which that line terminates. In either of the above cases, the subscriber is in a situation wherein the provision of means whereby he may create a three-way conference connection among himself and parties on two different lines terminating at his substation is a very desirable, if not necessary, adjunct to the service available to him. Typically, the multi-line substation subscriber may be engaged on a call with a distant party on one of the lines available to him, and, upon determining the desirability of adding another party to the conversation, would want to hold the first call, engage another party over another line, and then join himself and the two parties in a conference connection.

It is known to employ a common conference arrangement in the second case mentioned above, that of the wiring plan or key telephone system; this is frequently not economically justified, however, due to the fact that only a very few of the local subscribers may have occasion to use this facility. It is also known to create an inter-line connection by means of arrangements which are individual to a particular multi-line substation. These arrangements may be unsatisfactory in a number of respects, however: most generally, they permit a conference connection to be established only unilaterally, so that as between two lines, the original call must have been established on a particular one, and the added party may be obtained only on the other (i.e., these arrangements are not symmetrical); ofttimes, control of the conference connection is rendered unto one of the distant parties upon the establishment of the connection, thus depriving the local subscriber of authority in that respect, and even, in some cases, denying him ingress to the connection at all; finally, these arrangements are frequently complex in both equipment and operation, frustrating efforts to provide economical equipment requiring a minimum of subscriber skill and effort.

The principal object of this invention is to provide simple, inexpensive, and easy to operate means associated with a multi-line substation circuit, whereby a subscriber may join himself and parties on two lines terminating at his substation in a three-way conference connection.

A particular object of the invention is to provide means in accordance with the principal object and which is effective when operated to substitute conference holding bridges for any local, previously established holding arrangements on said two lines.

Another particular object of the invention is to provide means in accordance with the principal object and which is symmetrical and operable solely under the control of the multi-line substation subscriber.

Yet another particular object of the invention is to provide a multi-line substation subscriber with conference circuit means operable solely under his control and which is effective when operated to place conference holding bridges across two lines terminating at the substation and to positively render inoperable electromechanical holding arrangements individually associated with said two lines.

The principal feature of the invention is a conference circuit having means operable under the control of a multi-line substation subscriber, which means is operative to capacitively interconnect two lines terminating at the substation, to remove, in a positive manner, any local, previously established holding conditions on said lines, and to place conference holding bridges across said lines.

A particular feature of the invention is a conference circuit in accordance with the principal feature which is symmetrical and wherein the operative means is a relay operable solely under the control of the multi-line substation subscriber.

Another particular feature of the invention is a conference relay effective to place conference holding bridges across two lines terminating at a multi-line substation and to positively render inoperable electromechanical holding arrangements individually associated with said two lines.

A more perfect understanding of these and other features of the invention may be had upon perusal of the following description, the appended claims, and the drawing.

Turning now to the drawing, the major elements thereof are subscriber lines 51 and 52, local line circuits 49 and 50, and substation circuit 54. In general outline, the shown embodiment of the instant invention works in the following way: Let it be assumed that the subscriber at substation 54 (referred to hereinafter as subscriber 54) is engaged on a call wiht a distant party (referred to hereinafter as the original party) over one of the lines 51 and 52 terminating at substation 54, and that it is decided that another distant subscriber (referred to hereinafter as the added party) should be brought in on the call; subscriber 54 will operate his hold key, causing the engaged line to be bridged, and thus held, at its associated line circuit 49 or 50, and will release the line key associated with the engaged line; subscriber 54 will then operate the other line key and place a call in the normal manner to the added party; when the connection between subscriber 54 and the added party is completed, subscriber 54 will operate his conference key, whereupon (1) the two incoming lines will be interconnected through capacitors, (2) any local, previously established holding condition on either of lines 51 and 52, will be positively removed, and (3) a special conference holding bridge will be placed across each of the lines; a three-way conference connection is thus established, with the two lines capacitively linked at substation 54, and subscriber 54 joined in the conference via the last line key to be operated.

With regard to the following detailed description of the instant conference arrangement, it should be noted that the circuits shown in the upper and lower portions of the drawing are substantially symmetrical with respect to the common elements, signalling circuit 8, telephone circuit 53, hold and conference keys 20 and 19, and conference relay C. For the most part, therefore, the remarks hereinafter will be directed particularly toward detailed description of the circuits shown in the upper portion of the drawing (i.e., line 51, line circuit 49, line key K1, and circuits associated therewith), thus avoiding prolixity in presentation.

Line 51, comprising tip and ring conductors 1 and 2, may be of any of the well-known line types, such as an intercommunicating line, or a subscriber line originating at a P.B.X, or central office. The latter type is used for illustrative purposes here. Typical exchanges, supplying talking battery to subscriber lines, may be taken as the P.B.X disclosed in R. D. Williams United States Patent 2,904,637, granted September 15, 1959, and the central office exchange disclosed in A. J. Busch United States Patent 2,585,904, granted February 19, 1952. Line 51 extends to local line circuit 49. Line 52 is also shown originating at a central office or P.B.X, not necessarily the same central office or P.B.X at which line 51 originates, and line 52 extends to local line circuit 50.

Local line circuits 49 and 50 are shown symmetrically disposed respectively above and below common signalling circuit 8. The word local, used to characterize line circuits 49 and 50, refers to the fact that line circuits 49 and 50 ordinarily will be located on the same customer premises as the substations, such as substation 54, served by lines 51 and 52. Line circuits 49 and 50 each correspond to a line circuit such as that shown in Fig. 1 of H. T. Carter United States Patent 2,850,579, granted September 2, 1958, as part of the key telephone system disclosed therein. Only so much of the Carter line circuit as contributes to a fuller understanding of the instant invention has been included in line circuits 49 and 50. As shown and fully described in the Carter patent, the Carter line circuit performs, or causes to be performed, a number of functions incident to distributing a single incoming line over a plurality of local substations. Only the connecting and holding functions are of primary interest in the present description. Relay A1 is a connecting relay for extending line 51 through line circuit 49 to one or more local substations, such as substation 54. Relay H1 is a holding relay and is effective when operated to place a holding condition on line 51. Relays A1 and H1 of line circuit 49 correspond, respectively, to relays A and H in Fig. 1 of the Carter patent, supra; the same is true of relays A2 and H2 of line circuit 50. Line circuits 49 and 50 both cooperate with common signalling circuit 8. For example, circuit 8 will respond to incoming ringing signals on ring conductor 2 of line 51 by performing visual or audible signalling, or both, at substations, such as substation 54, associated with line 51. Circuit 8 performs a similar function with respect to line 52.

Signalling circuit 8 corresponds to the signalling circuit shown in detail on Fig. 3 of the Carter patent, and is operative to provide supervisory signalling to the substations served by line circuits 49 and 50. The matter of signalling is dealt with in detail in the Carter patent, supra. For the purposes of this description, it is sufficient to note that signalling circuit 8 illuminates lamps LA1 and LA2, via conductors 12 and 32, respectively, to alert subscriber 54 to the conditions of lines 51 and 52, respectively.

Conductors 9, 10, 11, and 12 are associated with line 51 and line circuit 49, and are used for extending line 51 to at least line key K1 of substation 54, and possibly to line keys at other substations, not shown. Conductor 9 extends tip conductor 1 to make contact 13 of key K1 via make contact 3 of relay A1; conductor 10 is the control conductor for relay A1 and extends to make contact 14 of line key K1; conductor 11 extends ring conductor 2 to make contact 15 of key K1 via make contact 4 of relay A1; conductor 12 is the signalling conductor associated with lamp LA1 and is energized from signalling circuit 8. For convenience in terminology hereinafter, line 51, conductors 1 and 2, and the extended portion of line 51, conductors 9 and 11, may be referred to jointly as line 51 (extended). Conductors 29, 30, 31 and 32 correspond, respectively, to conductors 9, 10, 11, and 12, supra, and are associated with line 52. It will be noted that, as in the case of conductors 9, 10, 11, and 12, conductors 29, 30, 31, and 32, in addition to extending to a line key (key K2) at substation 54, may be multipled to keys at other substations, not shown; the latter substations need not be the same as those to which conductors 9, 10, 11, and 12 are multipled.

Substation 54, shown partially in block diagram form, comprises telephone circuit 53, common conductors 16, 17, and 18, line keys K1 and K2, signalling lamps LA1 and LA2, hold key 20, conference key 19, conference relay C, and the conference circuitry associated with relay C. Telephone circuit 53 may be any suitable arrangement having the usual receiver, transmitter, and associated circuitry. Such associated circuitry in the present case includes at least switchhook contacts 36 and 37; in addition, a dial contact such as break contact 38 normally will be provided. The closure of switchhook contact 36, at a time when dial contact 38 is in its normal position, is effective to connect telephone circuit 53 across common talking conductors 16 and 17; the closure of switchhook contact 37, when hold key 20 is unoperated, is effective to place ground potential on common conductor 18.

Line keys K1 and K2 are operative to connect the lines appearing thereat, lines 51 and 52 (extended), respectively, to talking conductors 16 and 17. Make contact 14 of key K1 is for connecting common conductor 18 to control conductor 10 of relay A1; a corresponding provision is made for relay A2 at key K2. Other line keys, in addition to keys K1 and K2, may also be provided at substation 54.

Lamps LA1 and LA2 are illuminable by signalling circuit 8 in accordance with various conditions obtaining on lines 51 and 52, respectively. For instance, lamp LA1 may be flashed at a slow rate to indicate incoming ringing on line 51, may be flashed rapidly to indicate a locally established holding condition on line 51 (relay H1 operated), and lighted steadily to indicate that line 51 is engaged locally (relay A1 operated). These matters of local signalling are dealt with fully in the Carter patent, supra, and are not critical in the instant disclosure. In addition to a lamp, such as LA1 for example, an electromechanical ringer may be associated with line 51; the same is true for line 52.

Hold key 20 is common to line keys K1 and K2 and is operable to open the link between switchhook contact 37 and common conductor 18. When, for example, line 51 (extended) is engaged at substation 54 (switchhook contact 37, key K1, and relay A1 operated), the operation of hold key 20 removes ground potential from common conductor 18, causing line circuit 49 to place a holding condition (relay A1 released, relay H1 operated) on line 51. Obviously, a hold key individual to each line could be provided instead of common hold key 20 shown in the drawing.

Locking conference key 19 is common to lines 51 and 52 (extended) at substation 54 and is operable to cause the operation of conference relay C. Relay C, when operated, causes lines 51 and 52 (extended) to be interconnected through capacitors 40 and 41, causes conductors 10 and 30 to be conditioned with ground potential, and causes conference holding bridges 39 and 42 to be placed across lines 51 and 52 (extended), respectively.

Having described the components comprising an exemplary embodiment of the instant invention, a detailed description of the operation thereof will now be given.

*Incoming call*

When a distant subscriber, the original party, initiates a call to subscriber 54, the central office or P.B.X telephone exchange will cause ringing current to pass over ring conductor 2 of line 51. This ringing current will be detected by common signalling circuit 8, which will in turn cause lamp LA1 to flash intermittently, thus indicating to subscriber 54 that there is an incoming call on line 51. If conductor 12 is multipled to other substations, the lamps (not shown) corresponding to lamp LA1 will flash also.

When subscriber 54 responds to the flashing of lamp LA1, he will operate line key K1 and lift his receiver (not shown), closing switchhook contacts 36 and 37. With switchhook contact 37 and key K1 in their operated positions and hold key 20 released, a circuit for operating relay A1 will be completed, which circuit may be traced from ground at switchhook contact 37, over the break contact of hold key 20, common conductor 18, make contact 14 of key K1, control conductor 10, and through the winding of relay A1 to battery. Relay A1 operates in this circuit, completing a connection between line 51 and telephone circuit 53 which may be traced from tip conductor 1 of line 51, over make contact 3 of relay A1, conductor 9, make contact 13 of key K1, talking conductor 16, switchhook contact 36, dial contact 38, talking conductor 17, make contact 15 of key K1, conductor 11, and make contact 4 of relay A1 to ring conductor 2 of line 51. The connection between the original party and subscriber 54 is now complete and they may converse at will over line 51 (extended). It will be noted that with relay A1 operated, the upper and lower windings of hold relay H1, windings 5 and 6, respectively, are short-circuited at contacts 3 and 4, respectively, of relay A1. It may happen that relay H1 will operate momentarily when subscriber 54 operates key K1 and switchhook contacts 36 and 37. This operation may take place before relay A1 has time to operate, but, if so, relay H1 will release as soon as its windings are short circuited. This possible momentary operation of relay H1 would be of no consequence.

*Holding*

Assuming now that it is determined that another party should be added to the connection established as above, subscriber 54 will cause a holding condition to be placed on line 51 by line circuit 49. This is done by operating hold key 20. The effect of operating key 20 is to open the previously traced operating circuit for relay A1, causing relay A1 to release. Upon the release of relay A1, the short circuit is removed from the windings 5 and 6 of relay H1 and the latter relay operates across line 51 (extended). The operating circuit for relay H1 may be traced from ground on tip conductor 1 of line 51, through upper winding 5 of relay H1, over conductor 9, contact 13 of key K1, conductor 16, switchhook contact 36, dial contact 38, conductor 17, contact 15 of key K1, conductor 11, through lower winding 6 of relay H1, and thence to battery on ring conductor 2 of line 51. Upon the operation of relay H1, an inductive holding bridge, comprising windings 5 and 6 of relay H1 in series, is placed across line 51. The holding circuit is traceable from tip conductor 1, through upper winding 5, make contact 7, and lower winding 6 of relay H1, to ring conductor 2. When relay H1 has operated, keys K1 and 20 may be released. It will be noted that line key K1 must be released before the contacts of hold key 20 are permitted to reclose upon the release of key 20. The opposite order of release would re-establish the previously traced operating circuit for relay A1, which would then operate and short circuit the windings of relay H1, causing the latter relay to release. Subscriber 54 may therefore be required to release key K1 before releasing key 20. Alternatively, any well-known mechanical interlock arrangement may be provided which will automatically release key K1 when key 20 begins to release, but before the key 20 contacts reclose. The release of key K1 opens the above-traced operating circuit for relay H1; this relay remains operated, however, because the above-traced operating circuit is shunted by contact 7 of relay H1. It will be noted that hold key 20 and line key K1 must remain operated for at least the very short time it takes relay A1 to release and relay H1 to operate. Signaling circuit 8 will cause lamp LA1 to flash in a characteristic manner to indicate the held condition of line 51. Line 52 would be held in an analogous manner.

*Outgoing call*

When subscriber 54 has determined that another party is to be added in on the call previously established over, in this instance, line 51, and has placed a holding condition on line 51 as described in the preceding paragraph, he will then initiate a new call over the other line, line 52. Upon the concurrent operation of line key K2 and switchhook contacts 36 and 37, a circuit will be established for operating relay A2 in line circuit 50; this circuit may be traced from ground at switchhook contact 37, over the break contact of hold key 20, common conductor 18, make contact 34 of key K2, control conductor 30, and through the winding of relay A2 to battery. Relay A2 operates in this circuit and telephone circuit 53 is bridged across line 52 (extended) toward the central office or P.B.X in a circuit which may be traced from tip conductor 21 of line 52 over make contact 23 of relay A2, conductor 29, make contact 33 of key K2, talking conductor 16, switchhook contact 36, dial contact 38, talking conductor 17, make contact 35 of key K2, conductor 31, make contact 24 of relay A2, to ring conductor 22 of line 52. Assuming the central office or P.B.X to be automatic, dial tone, as well as battery and ground, will be supplied to subscriber 54 via line 52 (extended); subscriber 54 may then operate dial contact 38 in the normal manner in accordance with the telephone number of the added party. It will be assumed that the added party answers and that a connection is established via line 52 (extended) as previously traced. Signaling circuit 8 will light lamp LA2 to indicate the busy condition of line 52.

*Establishing the conference connection*

With line 51 held by the holding bridge comprising windings 5 and 6 of relay H1, and line 52 (extended) engaged via operated key K2, subscriber 54 may now proceed to unite himself and the original and added parties in a three-way conference connection by operating locking conference key 19. Upon the operation of key 19, relay C will operate in an obvious circuit. When relay C operates, control conductors 10 and 30 of relays A1 and A2 respectively, are grounded over contacts 43 and 48, respectively, of relay C. In the present instance, this will augment the ground supplied to control conductor 30 in the previously traced circuit from switchhook contact 37, thus making relay A2 independent of the latter circuit. When ground is applied to control conductor 10, relay A1, previously released when the relay H1 holding bridge was placed across line 51, will reoperate. When relay A1 reoperates, relay H1 will release due to its upper and lower windings 5 and 6 being short circuited at make contacts 3 and 4, respectively, of relay A1. Signaling circuit 8 will cause lamp LA1 to be lighted steadily. Relays A1 and A2 are therefore made operative under the primary control of conference key 19, and the local, previously established hold condition (windings of relay H1) is removed.

Another effect of the operation of relay C, is the interconnection of lines 51 and 52 (extended) at substation 54. Tip conductor 9 of line 51 (extended), is connected to tip conductor 29 of line 52 (extended) via capacitor 40 and make contact 45 of relay C; ring conductor 11 of line 51 (extended) is connected to ring conductor 31 of line 52 (extended) via capacitor 41 and make contact 46 of relay C.

Still another result of the operation of relay C is the bridging of lines 51 and 52 (extended) with inductors 39 and 42, respectively. Line 51 (extended) is bridged in a circuit from conductor 9, over contact 44 of relay C, and through inductor 39 to conductor 11; line 52 (extended) is bridged in a circuit from conductor 29, over contact 47 of relay C, and through inductor 42 to conductor 31.

In sum, therefor, the net effect of the operation of conference key 19 is to (1) substitute conference holding bridges for any other holding bridges previously established locally, (2) create a capacitive talking path between the original and added parties, and (3) leave subscriber 54 in on the conference connection via the last line key (K2 in this case) operated. It will be noted that the conference connection is completely under the control of subscriber 54, that the whole arrangement is symmetrical and could as readily have been created starting with an original call on line 52, that subscriber 54 may enter the conference connection via either one of keys K1 and K2, that subscriber 54 may leave the conference which will not be disturbed by the release of keys K1 and K2 or switchhook contacts 36 and 37, and that should the added party leave the connection when subscriber 54 is joined therein via key K2, subscriber 54 may resume direct conversation with the original party by releasing key K2, operating key K1, and then releasing conference key 19. Furthermore, when subscriber 54 ends the conference connection by releasing key 19, he need perform no operations in order to remove the original holding bridge from line 51, this having been accomplished automatically upon the operation of relay C.

The conference arrangement here described has been dealt with according to a particular order of operations; it should be understood that the arrangement is not so limited, and that subscriber 54 could establish a conference connection between lines 51 and 52 regardless of the order in which they had been seized and held. Also, conference key 19 could be mechanically associated with the receiver (not shown) of substation 54 so that key 19, as well as switchhook contacts 36 and 37, would be automatically released, and the conference connection thereby automatically terminated, when the receiver (not shown) is restored to its mounting (not shown). In addition, the invention is not limited to cooperation with the particular holding arrangement found in the Carter patent, supra, but may be used with any holding scheme where positive control thereof is exercized by the particular multi-line subscriber.

It is to be understood that the above-described arrangement is merely illustrative of the application of the principles of the invention; numerous other arrangements may be devised by those skilled in the art without departing from the spirit and scope of the invention.

What is claimed is:

1. In a telephone system, a substation having a substation circuit, a first and a second line terminating at said substation, a first and a second key for connecting said respective first and second lines to said circuit, a primary and a secondary holding means individual to each of said lines and effective to place holding conditions thereon, means associated with each of said lines for controlling the primary holding means individual thereto, means at said substation for causing said latter means to render effective the said primary holding means individual to a connected one of said lines, a conference key at said substation, and conference circuit means operable under the control of said conference key for interconnecting said first and second lines, for rendering effective said secondary holding means, and for causing said controlling means to render ineffective said primary holding means.

2. In a telephone system, a substation having a substation circuit, a first and a second line terminating at said substation, a first and a second key for connecting said respective first and second lines to said circuit, a primary and a secondary holding means individual to each of said lines and effective to place holding conditions thereon, physical means associated with each of said lines for controlling the primary holding means individual thereto, means at said substation for causing said latter means to render effective the said primary holding means individual to a connected one of said lines, a conference key at said substation, and conference circuit means operable solely under the control of said conference key for interconnectnig said first and second lines, for rendering effective said secondary holding means, and for causing said controlling means to render ineffective said primary holding means.

3. In a telephone system, a substation having a substation circuit, a first and a second line terminating at said substation, a first and a second key at said substation for connecting said respective first and second lines to said circuit, a primary holding bridge and a secondary holding bridge individual to each of said lines and effective to place holding conditions thereon, a control conductor associated with each of said lines for controlling the primary bridge individual thereto, hold means at said substation for causing the control conductor associated with a connected one of said lines to render effective the primary holding bridge individual to the said connected line, a conference key at said substation, and relay circuit means operable solely under the control of said conference key for interconnecting said first and second lines, for rendering effective said secondary holding means, and for causing said control leads to render ineffective said primary holding bridges.

4. In a telephone system, a substation having a substation circuit; a first and a second line terminating at said substation; a first and a second key at said substation for connecting said respective first and second lines to said circuit; a holding circuit individual to each of said lines and operable to place a holding condition on the one of said lines corresponding thereto; a control conductor associated with each of said holding circuits and terminating at said substation; a hold key at said substation operable to cause the said control conductor associated with the said holding circuit individual to a connected one of said lines to operate the said holding circuit associated therewith; and conference circuit means comprising a conference key at said substation, an interconnecting link, a first and a second bridge associated with said respective first and second lines, and conference relay means operable solely under the control of said conference key to interconnect said lines with said link, to bridge said first and second lines with said first and second bridges respectively, and to release an operated one of said holding circuits via the control conductor associated therewith.

5. In a telephone system, a substation having a substation circuit; a first and a second line each having a substation terminus; a first and a second key at said substation for connecting said respective first and second lines to said circuit; a holding circuit in each of said lines operable to place a holding condition on the one of said lines corresponding thereto; a control conductor associated with each of said holding circuits and terminating at said substation; a hold key at said substation operable to operate the said holding circuit corresponding to a connected one of said lines via the said control conductor associated therewith; and conference circuit means comprising a conference key at said substation, a conference link having capacitors therein for interconnecting said lines through said capacitors, first and second retardation coil bridges in said link and connectable in parallel relation with the substation termini of said first and second lines respectively, and a conference relay independent of said lines and operable under the control of said conference key to interconnect said lines through said conference link, to connect said first and second bridges in parallel relation with said respective first and second line termini, and to release an operated one of said holding circuits and render inoperable both of said holding circuits via said control conductors, whereby said first and second lines and said substation circuit are joined in a conference connection under the control of said conference key.

6. The invention claimed in claim 5 wherein each said holding circuit comprises a hold relay operatble to place a holding condition on the corresponding one of said lines, wherein each said holding circuit comprises connecting means operative to render said hold relay inoperable, and wherein said connecting means is operable in response to the operation of said conference relay.

7. The invention claimed in claim 6 wherein said hold relay has at least one winding, wherein said connecting means comprises at least one low impedance circuit, and wherein said connecting means comprises a connecting relay operable to connect said low impedance circuit across said winding.

8. The invention claimed in claim 7 wherein said hold relay has two windings, wherein said connecting means comprises two low impedance circuits respectively associated with said two windings, wherein said windings are connected in series to form a holding bridge across the associated one of said lines when said hold relay is operated, and wherein said connecting relay is operative in response to the operation of said conference relay to connect said two low impedance circuits across respective windings.

9. The invention claimed in claim 8 wherein said low impedance circuits are substantially short circuits and comprise make contacts of said connecting relay, wherein said connecting relay is operable via the associated one of said control conductors, wherein the operation of said conference relay is effective to render operative said connecting relay via said associated one of said control conductors, and wherein said operated connecting relay renders said hold relay inoperable by means of said short circuits.

No references cited.